United States Patent
Mohideen et al.

(10) Patent No.: US 9,659,412 B2
(45) Date of Patent: May 23, 2017

(54) METHODS AND SYSTEMS FOR DISPLAYING INFORMATION ON A HEADS-UP DISPLAY

(71) Applicant: HONEYWELL INTERNATIONAL INC., Morristown, NJ (US)

(72) Inventors: Mohammed Ibrahim Mohideen, Karnataka (IN); Mahesh Kumar Gellaboina, Karnataka (IN); Prasanna Murthy Gurajapu, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/813,855

(22) Filed: Jul. 30, 2015

(65) Prior Publication Data

US 2017/0032571 A1 Feb. 2, 2017

(51) Int. Cl.
| | | |
|---|---|---|
| G06T 19/00 | (2011.01) | |
| H04N 5/232 | (2006.01) | |
| G02B 27/01 | (2006.01) | |
| G06T 11/60 | (2006.01) | |
| G06T 7/00 | (2017.01) | |

(52) U.S. Cl.
CPC .......... *G06T 19/006* (2013.01); *G02B 27/017* (2013.01); *G06T 7/0081* (2013.01); *G06T 11/60* (2013.01); *H04N 5/23293* (2013.01); *G06T 2207/10004* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 7,737,987 B2 | 6/2010 | Wako | |
| 8,400,330 B2 | 3/2013 | He et al. | |
| 8,493,241 B2 | 7/2013 | He | |
| 8,681,073 B1 | 3/2014 | Robbins et al. | |
| 9,058,510 B1 * | 6/2015 | Bold | G06T 11/00 |
| 9,170,643 B2 * | 10/2015 | Dominici | G02B 27/01 |
| 2008/0158392 A1 * | 7/2008 | Nikata | G09G 5/377 |
| | | | 348/234 |
| 2009/0138138 A1 * | 5/2009 | Ferren | G01C 23/00 |
| | | | 701/3 |
| 2009/0201177 A1 * | 8/2009 | Soler | G01C 23/005 |
| | | | 340/974 |

(Continued)

FOREIGN PATENT DOCUMENTS

EP 2426461 A2 3/2012

OTHER PUBLICATIONS

Poddar, S. et al.,"Template Matching to Enhance HUD Colour Images," International Journal of Computer Applications, vol. 47—No. 9, Jun. 2012.

(Continued)

*Primary Examiner* — Jwalant Amin
(74) *Attorney, Agent, or Firm* — Lorenz & Kopf, LLP

(57) ABSTRACT

Methods and systems are provided for displaying information on a heads up display (HUD). A background image is captured with a camera. A plurality of regions of the background image are analyzed to determine a region-wise image attribute for each of the plurality of regions. A symbology having a symbology attribute is generated and overlaid on an overlay region of the background image to generate a heads up display image. The overlay region is one of the plurality of regions of the background image. The symbology attribute is adjusted based on the region-wise image attribute of the overlay region to generate an adjusted heads up display image. The adjusted heads up display image is displayed on the HUD.

17 Claims, 7 Drawing Sheets

(56) References Cited

U.S. PATENT DOCUMENTS

| | | | |
|---|---|---|---|
| 2009/0213037 A1 | 8/2009 | Schon | |
| 2013/0147401 A1* | 6/2013 | Choi | G09F 13/04 |
| | | | 315/322 |
| 2014/0160014 A1* | 6/2014 | Dominici | G02B 27/01 |
| | | | 345/156 |
| 2014/0354684 A1* | 12/2014 | Beckwith | G06F 3/011 |
| | | | 345/633 |

OTHER PUBLICATIONS

Karar V.,; "Tunneling Effect Mitigation Through Artificial Neural Network Based Head Up Display Switching System," 2012.

Berendsen P.,; "Head-up benefits," •FLIGHTDECKTECHNOLOGY, 2015.

Karar V. et al,; "Effect of Varying Contrast Ratio and Brightness Non-Uniformity Over Human Attention and Tunneling Aspects in Aviation," 2012.

Prinzel, Lawrence J., III et al.,; "Head-Up Displays and Attention Capture," NTRS, Feb. 1, 2004.

Iwata Y. et al.,; "Development of Night View System," Toyota Motor Corporation, 2001-2001.

Rockwell Collins,; "head-up guidance System (Hgs®)" 2008.

Karar V.,; "Tunneling Effect Mitigation Through Artificial Neural Network Based Head Up Display Switching System," A Theseis, Doctorate of Philosophy, Thapar University, Patiala IN, Aug. 29, 2014.

Extended EP Search Report for Application No. 16180920.7-1557 dated Mar. 16, 2017.

\* cited by examiner

HUD Before

HUD After

Normal IR Image

Enhanced IR Image

Adjusted HUD

METHODS AND SYSTEMS FOR DISPLAYING INFORMATION ON A HEADS-UP DISPLAY

TECHNICAL FIELD

The present disclosure generally relates to heads-up displays (HUDs), and more particularly to the displaying of information on HUDs and helmet mounted displays (HMDs) in aircraft.

BACKGROUND

Heads up displays (HUDs) are an intrinsic part of a modern aircraft cockpit for assisting and augmenting the decision making capability of the pilot. The HUDs, Windscreen Projection Displays, and Helmet Mounted Displays (HMDs) typically provide primary flight, navigation, and/or guidance information to the pilots in their forward field of view superimposed on a background image or a see-through combiner, thus allowing the simultaneous scanning of both instrument data and the out-of-the-window scene. This improves pilot decision making by providing information to the pilot without the pilot having to look down at the instrument panel.

Although HUDs have been deployed to improve flight performance and better situational awareness, there are perceptual and cognitive issues associated with HUDs. Through research a number of issues related to the pilot distribution of attention to near details (HUD symbologies) and far details (out-of-the-window scene), generally referred to as visual or cognitive capture, have been identified. The research also clearly shows the relationship between HUD symbology display characteristics (luminance, contrast ratio) and background lighting condition and the impact on a pilot's attention capture.

For example, pilots tend to focus on the HUD symbology and lose focus on background image details if a symbologies' contrast ratio is too high. Similarly, if the symbologies' contrast is too low, pilots may tend to focus on the background image and overlook information conveyed through the symbology. It would therefore be beneficial to adjust the attributes of the symbologies displayed on the HUD based on the background image. Accordingly, it is desirable to provide methods and systems for displaying information. Other desirable features and characteristics will become apparent from the subsequent detailed description and the appended claims, taken in conjunction with the accompanying drawings and the foregoing technical field and background.

BRIEF SUMMARY

Various embodiments of a method for displaying information on a heads up display, a method for displaying information on a display, and a system for displaying information are disclosed herein.

In one embodiment, the method for displaying information on a heads up display (HUD). A background image is captured with a camera. A plurality of regions of the background image are analyzed to determine a region-wise image attribute for each of the plurality of regions. A symbology having a symbology attribute is generated and overlaid on an overlay region of the background image to generate a heads up display image. The overlay region is one of the plurality of regions of the background image. The symbology attribute is adjusted based on the region-wise image attribute of the overlay region to generate an adjusted heads up display image. The adjusted heads up display image is displayed on the HUD.

In another embodiment, a background image is captured with a camera. A symbology having a symbology attribute and a symbology region is generated. The background image is segmented into a plurality of regions based on the symbology region that are analyzed to determine a region-wise image attribute for each of the plurality of regions. The symbology is overlaid on an overlay region of the background image to generate a display image. The overlay region is one of the plurality of regions of the background image corresponding to the symbology region. The symbology attribute is adjusted based on the region-wise image attribute of the overlay region to generate an adjusted display image. The adjusted display image is displayed on the display.

In another embodiment, a system for displaying information includes a display configured to display an image having a plurality of overlay regions. The system includes a display module having a processor and a memory. The display module is configured to generate and overlay a symbology on the overlay regions. The symbology has a symbology region and a symbology attribute. The system further includes a camera, in communication with the display module, configured to capture a background image having a plurality of regions corresponding at least to the overlay regions. The display module is configured to segment the background image based on the symbology region to generate a region-wise image attribute for each of the plurality of regions and adjust the symbology attribute based on the region-wise image attributes to generate the image.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
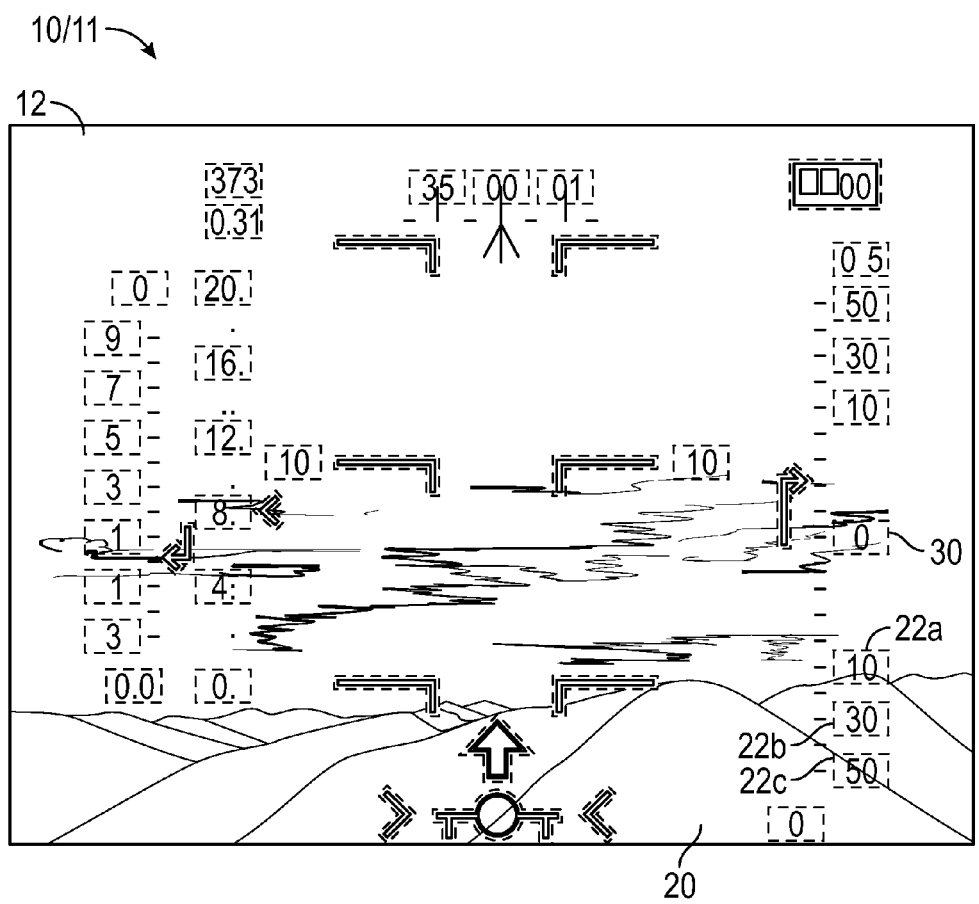
FIG. 1 illustrates a heads up display having information displayed in accordance with an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor module (shared, dedicated, or group) and memory module that executes one or more software or firmware programs, a combinational logic circuit, and/or other suitable components that provide the described functionality.

Referring to the Figures, a method 100 for displaying information on a heads up display (HUD) 10 is shown herein. FIG. 1 is a heads up display 10 displaying a heads up image 12 in accordance with the method 100 illustrated by the flowchart in FIG. 2A. The HUD 10 includes a background image 20 having a plurality of regions 22a-c. A symbology 30 is overlaid on an overlay region of the background image 20 to generate the heads up display image 12 on the HUD 10.

Figure 2A:
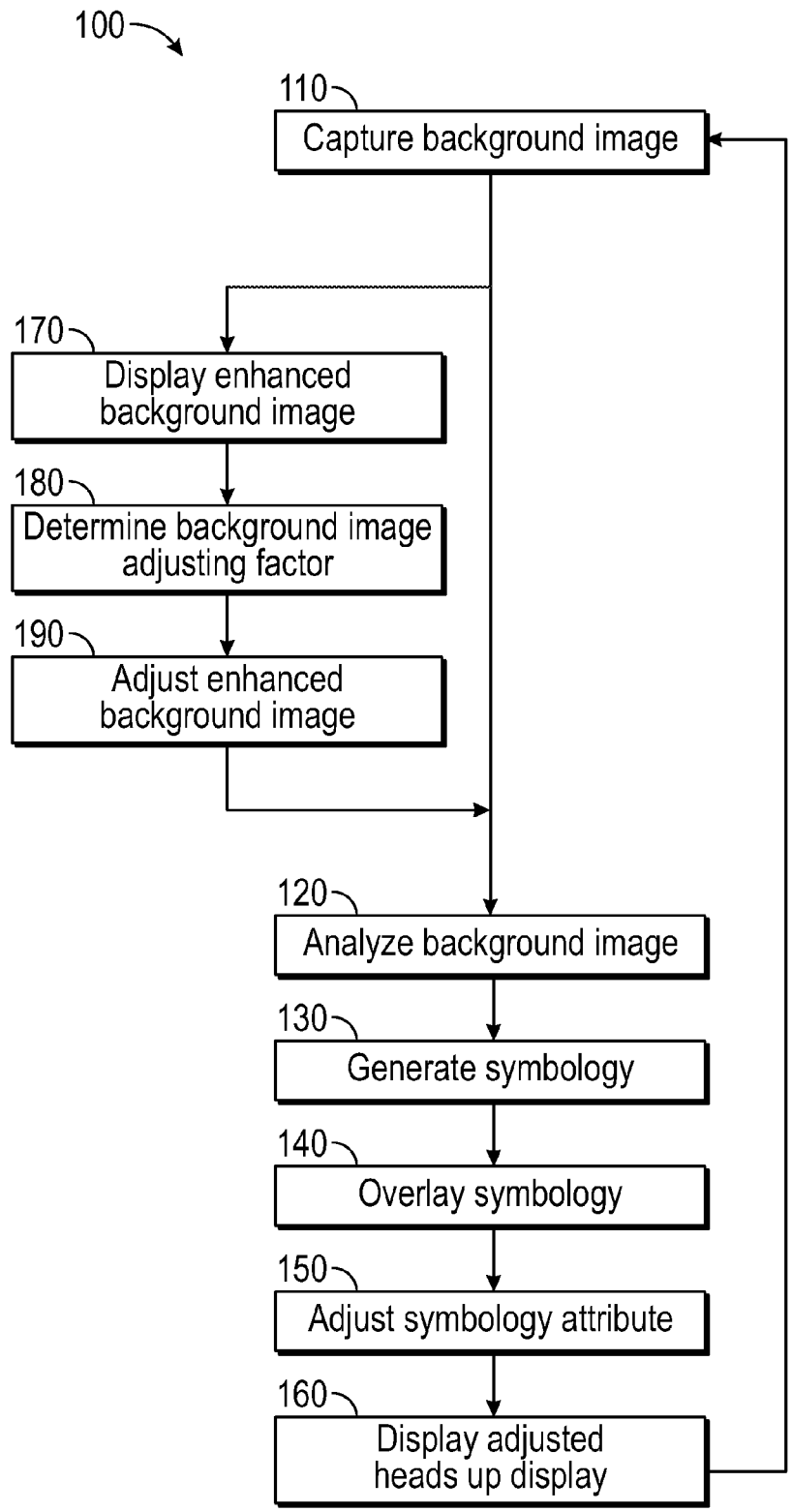
FIG. 2A is a flow chart illustrating a method for displaying information on a heads up display in accordance with an exemplary embodiment.
Figure 3A:
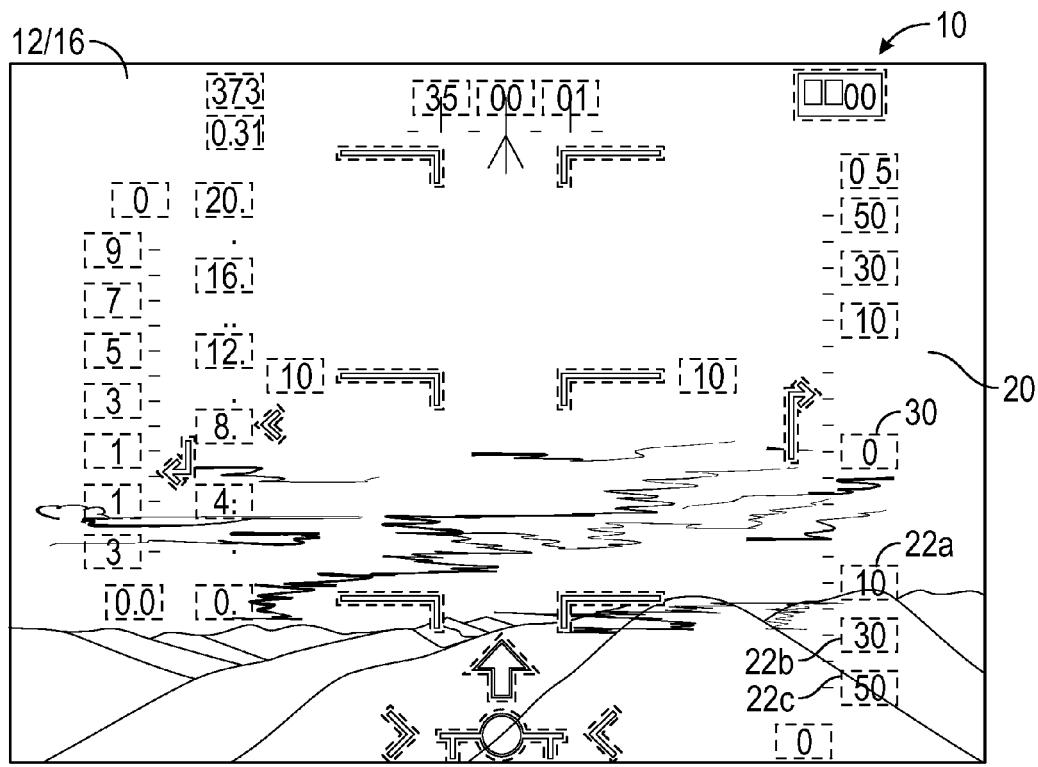
FIGS. 3A-3B illustrate heads up displays having information displayed in accordance with an exemplary embodiment.
Figure 3B:
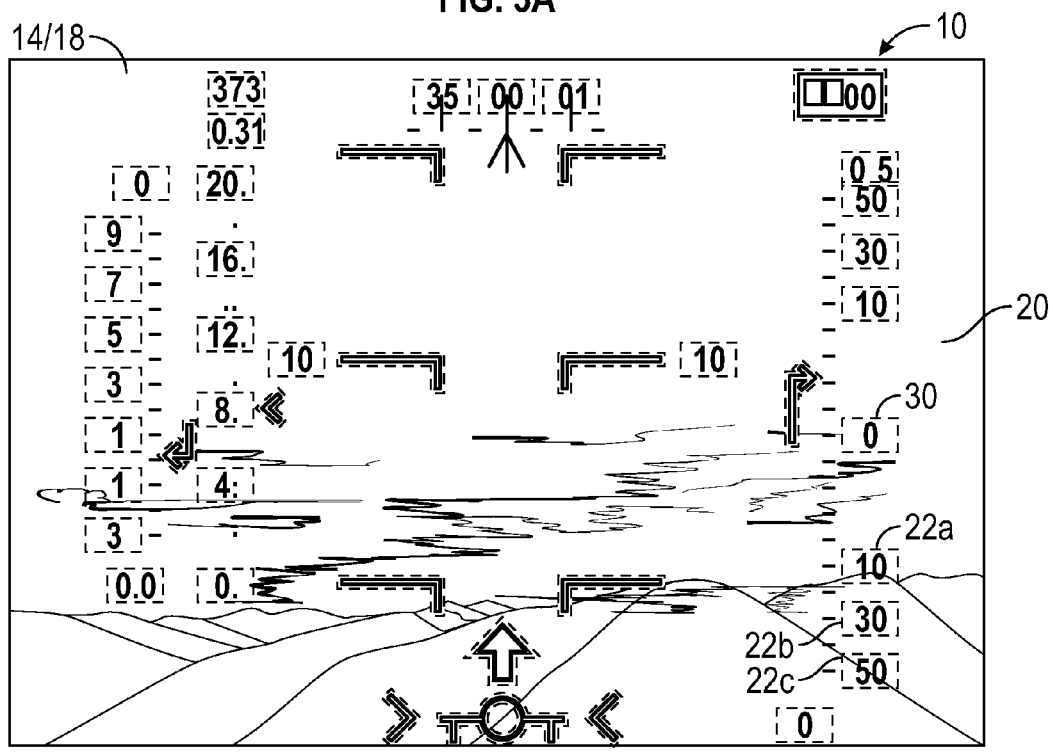

Referring now to FIGS. 2A and 3A-B, and with continued reference to FIG. 1, a flowchart illustrates the method 100 in accordance with the present disclosure. As can be appreciated in light of the disclosure, the order of operation within the method 100 is not limited to the sequential execution as illustrated in FIG. 2A, but may be performed in one or more varying orders as applicable and in accordance with the requirements of a given application.

The method 100 starts at block 110 capturing a background image 20 with a camera as is known to those skilled in the art. At block 120, the plurality of regions 22a-c of the background image 20 are analyzed to determine a region-wise attribute for each of the plurality of regions 22a-c. In a preferred embodiment of block 120, the contrast ratio of background image 20 is analyzed. In a non-limiting embodiment, the analysis is performed using intensity based image thresholding or Gaussian mixture model based image analysis, however, one skilled in the art will appreciate that additional image processing algorithms may be employed to analyze the contrast ratio of the background image 20 without departing from the spirit of the invention.

At block 130, a symbology 30 having a symbology attribute is generated. As shown in the Figures and detailed above, the symbology 30 includes relevant information that is displayed by the HUD 10. While many symbologies 30 are displayed on the HUD 10, the operation of the method 100 with respect to one symbology 30 will be used for simplicity.

At block 140, the symbology 130 is overlaid on an overlay region of the background image 20 to generate a heads up display image 12. The overlay region is one of the plurality of regions 22a-c of the background image 20. At block 150, the symbology attribute is adjusted based on the region-wise image attribute of the overlay region to generate an adjusted heads up display image 14. At block 160, the adjusted heads up display image 14 is displayed on the HUD 10.

In this way, the method 100 displays information on the HUD 10 by adjusting the symbology attribute to generate the adjusted heads up display image 14. This, in turn, improves the readability of the symbologies 30 displayed on the HUD 10 across the background image 20. As shown in FIG. 3B relative to FIG. 3A, adjusting the symbology attribute improves the readability of the symbologies 30 displayed on the HUD 10.

In one embodiment, at block 150 the symbology attributes are adjusted such that one or more symbology attributes relative an associated overlay region attribute is actually or perceived to be the same, thereby providing a uniform symbology readability level. In a non-limiting example, the symbology attribute is adjusted such that the actual or perceived contrast ratio for each of the symbologies 30 relative to its associated overlay region is uniform throughout the HUD 10. In another non-limiting example, the symbology attribute is adjusted such that the actual or pereceived luminance for each of the symbologies 30 relative to its associated overlay region is uniform throughout the HUD 10. In a further non-limiting example, the symbology attribute is adjusted such that the actual or perceived intensity for each of the symbologies 30 relative to its associated overlay region is uniform throughout the HUD 10. As indicated above, multiple symbology attributes may be adjusted relative to an associates overlay region attribute such that they are actually or perceived to be the same, thereby providing a uniform symbology readability level.

In one embodiment, at block 150 the symbology attributes are adjusted to enhance the readability level of some symbologies 30 relative to other symbologies 30 on the HUD 10. In a non-limiting example, the symbology attribute is adjusted such that the actual or perceived contrast ratio, luminance, and/or intensity of a particular symbology 30 is greater than the actual or perceived contrast ratio, luminance, and/or intensity of the other symbologies displayed on the HUD 10.

In one embodiment, at block 150 the symbology attributes are adjusted to decrease the readability level of some symbologies 30 relative to other symbologies 30 on the HUD 10. In a non-limiting example, the symbology attribute is adjusted such that the actual or perceived contrast ratio, luminance, and/or intensity of a particular symbology 30 is less than the actual or perceived contrast ratio, luminance, and/or intensity the other symbologies displayed on the HUD 10.

In this way, the symbologies 30 may be uniformly displayed on the HUD 10 or the symbologies 30 may be variably adjusted relative to one another to prioritize certain symbologies 30. For example, certain symbologies 30 may be prioritized based on a condition such as takeoff, landing, an emergency situation, or to bring pertinent information to the pilot's attention.

In one embodiment, the region-wise image attribute may include at least one of an intensity, a contrast ratio, and a luminance. Other image attributes such as brightness, color, vibrance, and/or saturation may be a region-wise attribute. One skilled in the art will appreciate that these attributes may be used as factors when analyzing the background image 20.

In one embodiment, the symbology attribute may include at least one of a contrast ratio, a luminance and/or an intensity. Other display attributes such as brightness, color, vibrance, and/or saturation may be a symbology attribute. Thus, at block 150 one or more of these symbology attributes may be adjusted based on one or more of the region-wise image attributes of the overlay region to generate an adjusted display image 18. One skilled in the art will appreciate that these attributes may be used to adjust the actual or perceived appearance of the symbology 30 on the HUD 10 relative to the background image 20 and other symbologies 30 on the HUD.

Figure 4A:
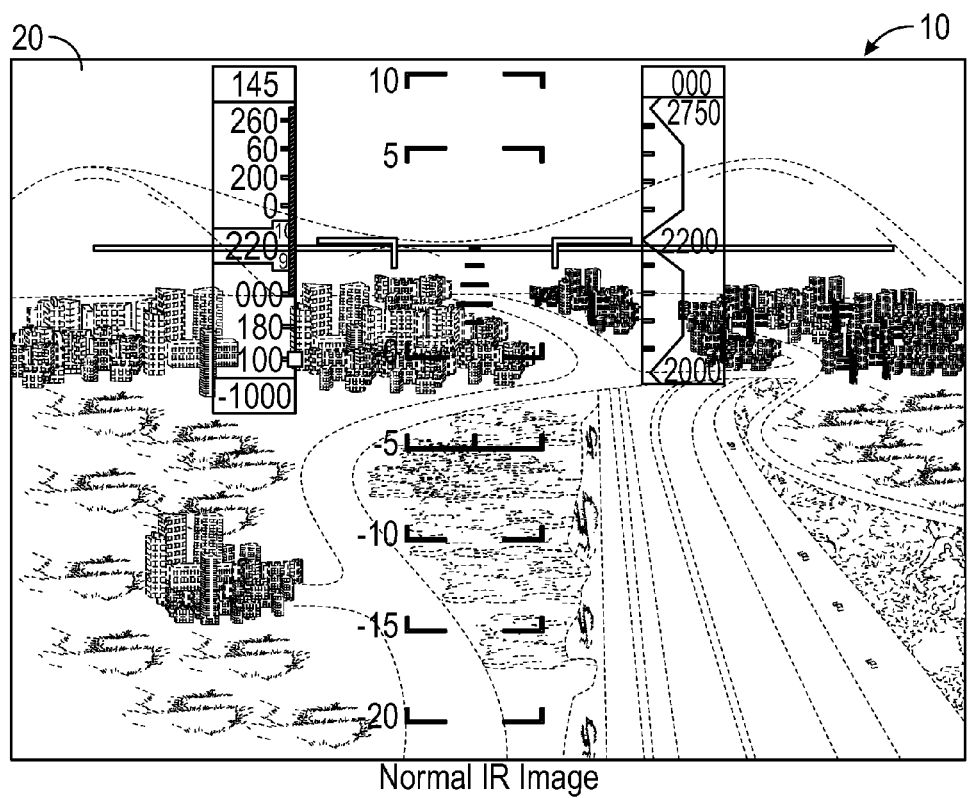
FIGS. 4A-C illustrate heads up displays having an enhanced background image and information displayed in accordance with an exemplary embodiment.
Figure 4B:
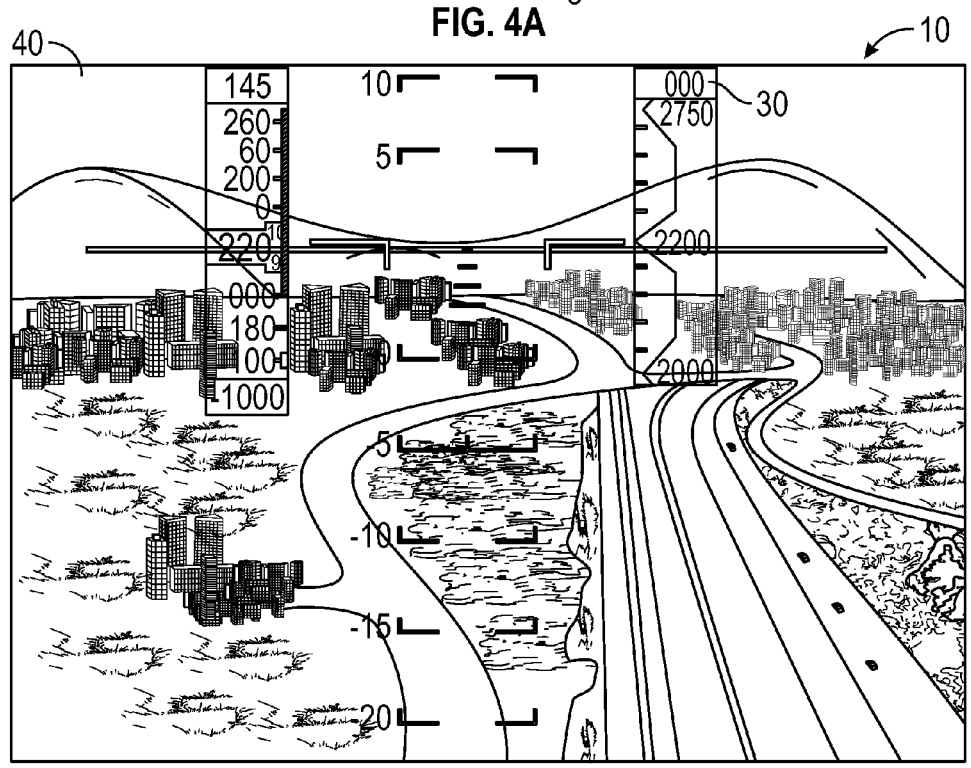
Figure 4C:
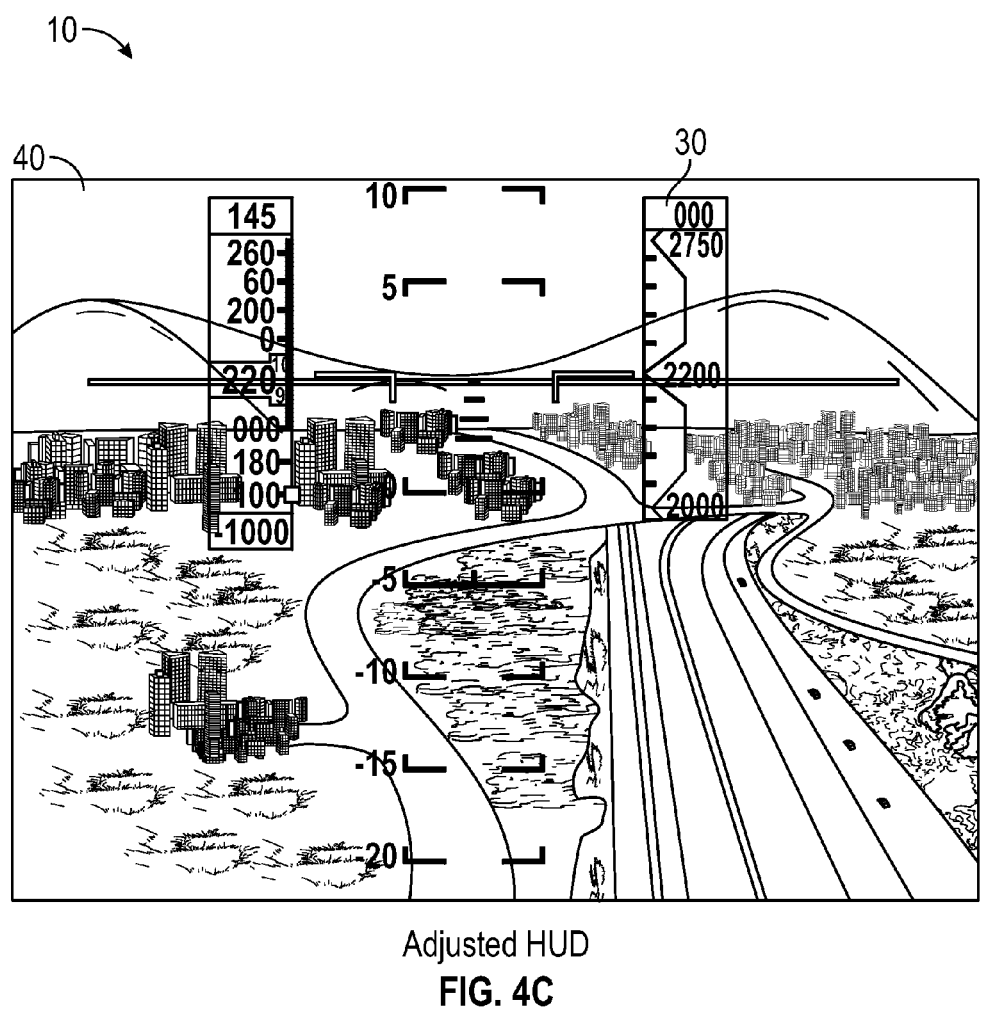

In one embodiment and with reference to FIGS. 4A-C, the method 100 further includes block 170 in which an enhanced background image 40 is displayed on the HUD 10. At block 180 a background image adjusting factor is determined based on an enhanced region-wise image attribute. The enhanced region-wise image attribute includes at least one of an intensity, a contrast ratio, and a luminance. At block 190, the enhanced background image 40 is adjusted based on the background image adjusting factor. Following block 190, the method 100 proceeds to block 120 and analyzes the enhanced background image 40.

In one embodiment, the enhanced background image 40 includes at least one of an infrared image, a thermal image, and an enhanced flight vision system image. As known to those skilled in the art, enhanced background images 40 may be used in conditions in which normal visibility is impaired or to improve the pilot's view. Non-limiting conditions include darkness, inclement weather, or any situation in which the use of an enhanced background image 40 may improve the pilot's visibility. In these situations, the method 100 adjusts the symbology attribute based on the enhanced background image 40.

In one embodiment, the enhanced region-wise image attribute includes at least one of an intensity, a contrast ratio, and a luminance. One skilled in the art will appreciate that these attributes may be used as factors when analyzing and adjusting the enhanced background image 40.

Figure 2B:
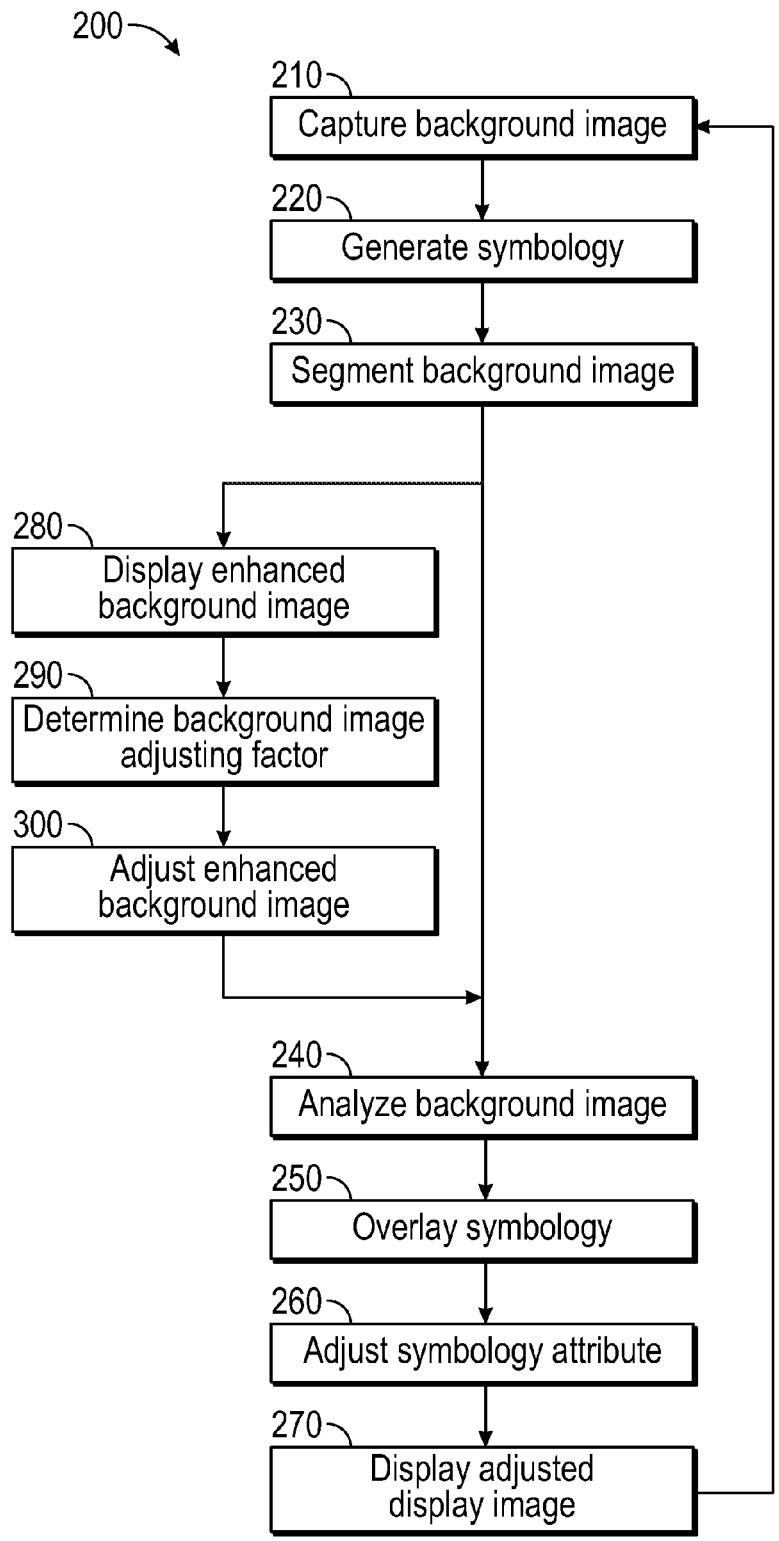
FIG. 2B is a flow chart illustrating a method for displaying information on a display in accordance with another exemplary embodiment.

Referring now to FIGS. 2B and 3A-B, and with continued reference to FIGS. 1 and 2A, a flowchart illustrates another method 200 in accordance with the present disclosure. As can be appreciated in light of the disclosure, the order of operation within the method 200 is not limited to the sequential execution as illustrated in FIG. 2B, but may be performed in one or more varying orders as applicable and in accordance with the requirements of a given application.

Relative to the method 100, the method 200 displays information on a display 11. In a non-limiting embodiment the display 11 includes a HUD 10, a helmet mounted display, and a display screen.

The method 200 starts at block 210 capturing a background image 20 with a camera as is known to those skilled in the art. At block 220, a symbology 30 having a symbology attribute and a symbology region is generated. The symbology region is a predetermined location on the display 11 where the symbology 30 will be overlaid. The size and shape of the symbology region relative to the symbology 30 is at least as large as the symbology 30 and may be larger so as to encompass an area on the display 11 larger than the overall size of the symbology 30.

As shown in the Figures and detailed above, the symbology 30 includes relevant information that is displayed by the display 11. While many symbologies 30 are displayed on the display 11, the operation of the method 100 with respect to one symbology 30 will be used for simplicity.

At block 230, the background image 20 is segmented into the plurality of regions 22a-c based on the symbology region. At block 240, the plurality of regions 22a-c are analyzed to determine a region-wise attribute for each of the plurality of regions 22a-c. In a preferred embodiment of block 240, the contrast ratio of background image 20 is analyzed. In a non-limiting embodiment, the analysis is performed using intensity based image thresholding or Gaussian mixture model based image analysis, however, one skilled in the art will appreciate that additional image processing algorithms may be employed to analyze the contrast ratio of the background image 20 without departing from the spirit of the invention.

At block 250, the symbology 130 is overlaid on an overlay region of the background image 20 to generate a display image 16. The overlay region is one of the plurality of regions 22a-c of the background image 20 corresponding to the symbology region. At block 260, the symbology attribute is adjusted based on the region-wise image attribute of the overlay region to generate an adjusted display image 18. At block 270, the adjusted display image 18 is displayed on the display 11.

In this way, the method 200 displays information on the display 11 by adjusting the symbology attribute to generate the adjusted display image 18. This, in turn, improves the readability of the symbologies 30 displayed on the display 11 across the background image 20. As shown in FIG. 3B relative to FIG. 3A, adjusting the symbology attribute improves the readability of the symbologies 30 displayed on the display 11.

In one embodiment, at block 260 the symbology attributes are adjusted such that one or more symbology attributes relative an associated overlay region attribute is actually or perceived to be the same, thereby providing a uniform symbology readability level. In a non-limiting example, the symbology attribute is adjusted such that the actual or perceived contrast ratio for each of the symbologies 30 relative to its associated overlay region is uniform throughout the display 11. In another non-limiting example, the symbology attribute is adjusted such that the actual or perceived luminance for each of the symbologies 30 relative to its associated overlay region is uniform throughout the display 11. In a further non-limiting example, the symbology attribute is adjusted such that the actual or perceived intensity for each of the symbologies 30 relative to its associated overlay region is uniform throughout the display 11. Again, as indicated above, multiple symbology attributes may be adjusted relative to an associates overlay region attribute such that they are actually or perceived to be the same, thereby providing a uniform symbology readability level.

In one embodiment, at block 260 the symbology attributes are adjusted to enhance the readability level of some symbologies 30 relative to other symbologies 30 on the display 11. In a non-limiting embodiment, the symbology attribute is adjusted such that the actual or perceived contrast ratio, luminance, and/or intensity of a particular symbology 30 is greater than the actual or perceived contrast ratio, luminance, and/or intensity for the other symbologies displayed on the display 11.

In one embodiment, at block 260 the symbology attributes are adjusted to decrease the readability level of some symbologies 30 relative to other symbologies 30 on the display 11. In a non-limiting embodiment, the symbology attribute is adjusted such that the actual or perceived contrast ratio, luminance, and/or intensity of a particular symbology 30 is less than the actual or perceived contrast ratio, luminance, and/or intensity of the other symbologies displayed on the display 11.

In this way, the symbologies 30 may be uniformly displayed on the display 11 or the symbologies 30 may be variably adjusted relative to one another to prioritize certain symbologies 30. For example, certain symbologies 30 may be prioritized based on a condition such as takeoff, landing, an emergency situation, or to bring pertinent information to the pilot's attention.

In one embodiment, the region-wise image attribute may include at least one of, a contrast ratio, a luminance and/or an intensity. Other image attributes such as brightness, color, vibrance, and/or saturation may be a region-wise image attribute. One skilled in the art will appreciate that these attributes may be used as factors when analyzing the background image 20.

In one embodiment, the symbology attribute may include at least one of an intensity, a contrast ratio, and a luminance. Other display attributes such as brightness, color, vibrance, and/or saturation may be a symbology attribute. Thus, at block 260 one or more of these symbology attributes may be adjusted based on one or more of the region-wise image attributes of the overlay region to generate an adjusted display image 18. One skilled in the art will appreciate that these attributes may be used to adjust the actual or perceived appearance of the symbology 30 on the display 11 relative to the background image 20 and other symbologies 30 on the display 11.

In one embodiment and with reference to FIGS. 4A-C, the method 200 further includes block 280 in which an enhanced background image 40 is displayed on the display 11. At block 290 a background image adjusting factor is determined based on an enhanced region-wise image attribute. The enhanced region-wise image attribute includes at least one of an intensity, a contrast ratio, and a luminance. At block 300, the enhanced background image 40 is adjusted based on the background image adjusting factor. Following block 300, the method 200 proceeds to block 240 and analyzes the enhanced background image 40.

In one embodiment, the enhanced background image 40 includes at least one of an infrared image, a thermal image, and an enhanced flight vision system image. As known to those skilled in the art, enhanced background images 40 may be used in conditions in which normal visibility is impaired or to improve the pilot's view. Non-limiting conditions include darkness, inclement weather, or any situation in which the use of an enhanced background image 40 may improve the pilot's visibility. In these situations, the method 200 adjusts the symbology attribute based on the enhanced background image 40.

In one embodiment, the enhanced region-wise image attribute may include at least one of a contrast ratio, a luminance, and/or an intensity. Other image display attributes such as brightness, color, vibrance, and/or saturation may be a region-wise image attribute. One skilled in the art will appreciate that these attributes may be used as factors when analyzing and adjusting the enhanced background image 40.

Figure 5:
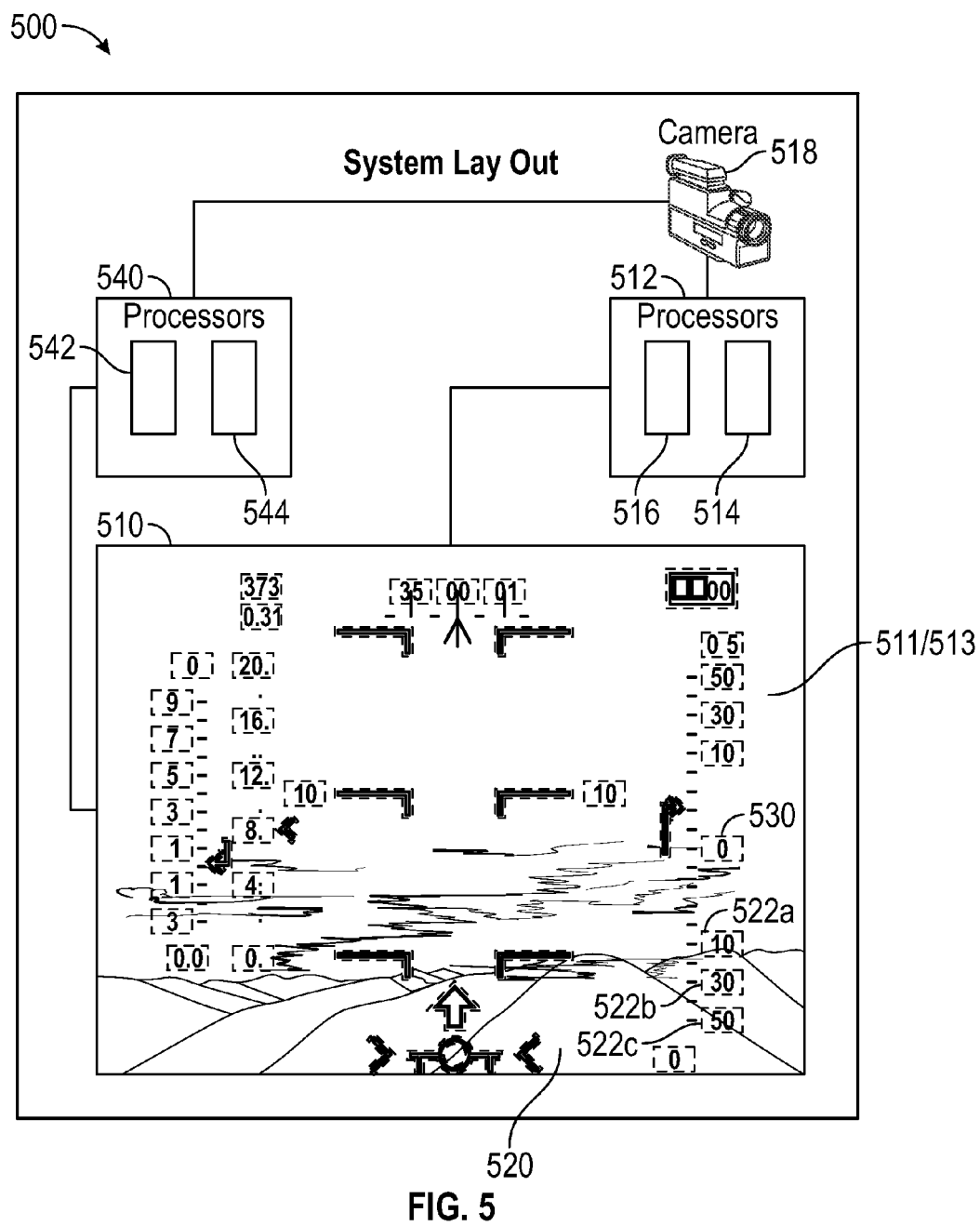
FIG. 5 is a schematic view of a system for displaying information in accordance with an exemplary embodiment.

With reference to FIG. 5, and with continued reference to FIGS. 1-4, a system 500 for displaying information according to the previously described methods 100, 200 is provided. The system 500 includes a display 510 configured to display an image 511 having a plurality of overlay regions. The system 500 includes a display module 512 having a processor 514 and a memory 516. The display module 512 is in communication with the display 510 and is configured to generate and overlay a symbology 530 on the overlay regions of the image 511. The symbology 530 has a symbology region and a symbology attribute.

The system 500 includes a camera 518 in communication with the display module 512. The camera 518 is configured to capture a background image 520 having a plurality of regions 522a-c corresponding at least to the overlay regions of the image 511. The system 500 segments the background image 520 based on the symbology region to generate a region-wise image attribute for each of the plurality of regions 522a-c. The symbology attribute is adjusted based on the region-wise image attributes to generate the image 511.

In this way, the system 500 displays information on the display 510 by adjusting the symbology attribute to generate the image 511 using the methods 100, 200 described above. This, in turn, improves the readability of the symbologies 30 displayed on the display 511 across the background image 520. As shown in FIG. 3B relative to FIG. 3A, adjusting the symbology attribute improves the readability of the symbologies 30 displayed on the display 511.

One skilled in the art will appreciate that the depiction of the system 500 and the various components are merely exemplary and are not limiting with respect to size of the components or location within the system 500. Thus, the present disclosure is not limited to any specific layout and the system 500 may include additional electronic components not shown in its implementation.

Similar to the previously described embodiments, the display module 512 is configured to adjust the symbology attributes to a uniform symbology readability level. In one embodiment, the symbology attributes are adjusted to enhance the readability level of some symbologies 30 relative to other symbologies 30 on the display 510. In one embodiment, the symbology attributes are adjusted to decrease the readability level of some symbologies 30 relative to other symbologies 30 on the display 510. In this way, the symbologies 30 may be uniformly displayed on the display 510 or the symbologies 30 may be variably adjusted relative to one another to prioritize certain symbologies 30. For example, certain symbologies 30 may be prioritized based on a condition such as takeoff, landing, an emergency situation, or to bring pertinent information to the pilot's attention.

In one embodiment, the region-wise image attribute may include at least one of a contrast ratio, a luminance, and/or an intensity. Other image attributes such as brightness, color, vibrance, and/or saturation may be the region-wise image attribute. One skilled in the art will appreciate that these attributes may be used as factors when analyzing the background image 520.

In one embodiment, the symbology attribute may include at least one of a contrast ratio, a luminance, and/or an intensity. Other display attributes such as brightness, color, vibrance, and/or saturation may be a symbology attribute. One skilled in the art will appreciate that these attributes may be used to adjust the actual or perceived appearance of the symbology 30 on the display 510 relative to the background image 520 and other symbologies 30 on the display 510.

In one embodiment and with reference to FIGS. 4A-C, the system 500 further includes an enhanced vision module 540 having a processor 542 and a memory 544. The enhanced vision module 540 is in communication with the camera 518 and the display module 512 and is configured to display an enhanced image 513 on the display 510. Similar to the previously described embodiments, the enhanced vision module is configured to determine a background image adjusting factor, based on an enhanced region-wise image attribute, and adjust the enhanced image 513 based on the background image adjusting factor. The display module 512 then adjusts the symbology attributes based on the enhanced image 513 from the enhanced vision module 540.

In one embodiment, the enhanced image 513 includes at least one of an infrared image, a thermal image, and an enhanced flight vision system image. As known to those skilled in the art, enhanced images 513 may be used in conditions in which normal visibility is impaired or to improve the pilot's view. Non-limiting conditions include darkness, inclement weather, or any situation in which the use of an enhanced image 513 may improve the pilot's visibility. In these situations, the system 500 adjusts the symbology attribute based on the enhanced image 513.

In one embodiment, the enhanced region-wise image attribute includes at least one of an intensity, a contrast ratio, and a luminance. One skilled in the art will appreciate that these attributes may be used as factors when analyzing and adjusting the enhanced image 513.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as setforth in the appended claims.

What is claimed is:

1. A method for displaying information on a heads up display (HUD), comprising:
capturing a background image with a camera;
analyzing a plurality of regions of the background image to determine a region-wise image attribute for each of the plurality of regions;
generating a symbology having a symbology attribute;
overlaying the symbology on an overlay region of the background image to generate a heads up display image, wherein the overlay region is one of the plurality of regions of the background image;
adjusting the symbology attribute based on the region-wise image attribute of the overlay region to generate an adjusted heads up display image; and
displaying the adjusted heads up display image on the HUD, wherein the symbology attributes are adjusted relative to the associated region-wise image attributes such that the adjusted heads up display image has a uniform symbology readability level.

2. The method of claim 1, wherein the region-wise image attribute comprises at least one of an intensity, a contrast ratio, and a luminance.

3. The method of claim 1, wherein each of the symbology attributes comprises at least one of an intensity, a contrast ratio, and a luminance.

4. The method of claim 1, further comprising:
displaying an enhanced background image on the HUD;
determining a background image adjusting factor based on an enhanced region-wise image attribute; and
adjusting the enhanced background image based on the background image adjusting factor.

5. The method of claim 4, wherein the enhanced background image comprises at least one of an infrared image, a thermal image, and an enhanced flight vision system image.

6. The method of claim 4, wherein the enhanced region-wise image attribute comprises at least one of an intensity, a contrast ratio, and a luminance.

7. A method for displaying information on a display, comprising:
capturing a background image with a camera;
generating a symbology having a symbology attribute and a symbology region;
segmenting the background image into a plurality of regions based on the symbology region;
analyzing the plurality of regions of the background image to determine a region-wise image attribute for each of the plurality of regions;
overlaying the symbology on an overlay region of the background image to generate a display image, wherein the overlay region is one of the plurality of regions of the background image corresponding to the symbology region;
adjusting the symbology attribute based on the region-wise image attribute of the overlay region to generate an adjusted display image; and
displaying the adjusted display image on the display, wherein the symbology attributes are adjusted relative to the associated region-wise image attributes such that the adjusted heads up display image has a uniform symbology readability level.

8. The method of claim 7, wherein the background image attribute comprises at least one of an intensity, a contrast ratio, and a luminance.

9. The method of claim 7, wherein each of the symbology attributes comprises at least one of an intensity, a contrast ratio, and a luminance.

10. The method of claim 7, further comprising:
displaying an enhanced background image on the display;
determining a background image adjusting factor based on an enhanced background image attribute; and
adjusting the enhanced background image based on the background image adjusting factor.

11. The method of claim 10, wherein the enhanced background image comprises at least one of an infrared image, a thermal image, and an enhanced flight vision system image.

12. The method of claim 10, wherein the enhanced background image attribute comprises at least one of an intensity, a contrast ratio, and a luminance.

13. A system for displaying information, comprising:
a display configured to display an image having a plurality of overlay regions;
a display module having a processor and a memory, the display module configured to generate and overlay a symbology on the overlay regions, the symbology having a symbology region and a symbology attribute; and
a camera, in communication with the display module, configured to capture a background image having a plurality of regions corresponding at least to the overlay regions,
wherein the background image is segmented based on the symbology region to generate a region-wise image attribute for each of the plurality of regions and the symbology attribute is adjusted based on the region-wise image attributes to generate the image with a uniform symbology readability level.

14. The system of claim 13, wherein the region-wise image attribute comprises at least one of an intensity, a contrast ratio, and a luminance.

15. The system of claim 13, wherein each of the symbology attributes comprises at least one of an intensity, a contrast ratio, and a luminance.

16. The system of claim 13, further comprising:
an enhanced vision module having a processor and a memory, the enhanced vision module configured to receive the background image from the camera and generate an enhanced image on the display,
wherein the enhanced vision module is configured to determine a background image adjusting factor, based on an enhanced region-wise image attribute, and adjust the enhanced image based on the background image adjusting factor.

17. The system of claim 16, wherein the enhanced image comprises at least one of an infrared image, a thermal image, and an enhanced flight vision system image and the enhanced region-wise image attribute comprises at least one of an intensity, a contrast ratio, and a luminance.

* * * * *